United States Patent
Song

(10) Patent No.: US 6,484,851 B2
(45) Date of Patent: Nov. 26, 2002

(54) PARKING BRAKE FOR AUTOMOBILES

(76) Inventor: Jae Hyu Song, 3/8, 169-52 Suyu-3-dong, Gangbuk-gu, Seoul (KR), 142-876

(*) Notice: Subject to any disclaimer, the term of this patent is extended or adjusted under 35 U.S.C. 154(b) by 0 days.

(21) Appl. No.: 09/928,816

(22) Filed: Aug. 13, 2001

(65) Prior Publication Data

US 2002/0020587 A1 Feb. 21, 2002

(51) Int. Cl.$^7$ ................................. B60T 1/00
(52) U.S. Cl. ..................... 188/31; 188/69; 188/265
(58) Field of Search ....................... 188/31, 68, 69, 188/189, 265, 74, 106 D; 74/532, 533, 534

(56) References Cited

U.S. PATENT DOCUMENTS

| | | | | |
|---|---|---|---|---|
| 677,635 A | * | 7/1901 | Callahan et al. | 188/31 |
| 1,872,146 A | * | 8/1932 | Jackson | 188/31 |
| 2,425,574 A | * | 8/1947 | Stewack | 188/31 |
| 3,241,637 A | * | 3/1966 | Temple | 188/69 |
| 5,113,977 A | * | 5/1992 | Ridings et al. | 188/31 |
| 5,799,756 A | * | 9/1998 | Roberts et al. | 188/31 |
| 5,887,489 A | * | 3/1999 | Zerrer | 188/69 |
| 5,983,745 A | | 11/1999 | Petrak | 74/502.4 |
| 6,105,732 A | | 8/2000 | Venetos | 188/20 |

FOREIGN PATENT DOCUMENTS

| | | | | |
|---|---|---|---|---|
| GB | 397521 | * | 8/1933 | 188/31 |

* cited by examiner

Primary Examiner—Jack Lavinder
Assistant Examiner—Thomas J. Williams
(74) Attorney, Agent, or Firm—Madson & Metcalf

(57) ABSTRACT

A parking brake for automobiles is disclosed including a brake disk having ratchets to secure interruption of the wheels in parking the automobiles, a caliper arranged on the brake disk forming an inserting groove, an intermittent member engaged into the inserting groove for selectively controlling the brake disk, and connecting means connected with the intermittent member for delivering the actuating force to the intermittent member in actuating the parking brake lever. A rod bar is arranged below the connecting means, forming a hinge connected to the connecting means at one end and a variable portion at the other end. A moveable link connected to the rod bar, having a pair of auxiliary links, and a fixed link are controlled by the parking brake lever to engage the intermittent member into the ratchet of the brake disk to engage the wheels in parking the automobiles.

9 Claims, 2 Drawing Sheets

PARKING BRAKE FOR AUTOMOBILES

TECHNICAL FIELD

The present invention relates to parking brakes and, more specifically, to an improved parking brake in which interruption of the parking brake is achieved not by disk pad fixation but by pin fixation to achieve secure interruption and to securely brake.

BACKGROUND ART

Automobile brake is typically achieved by foot or hand brakes in which lever or linkage is used to interrupt brake wheel and brake disk of the rear brake drum by use of cable or rod.

When the operator pulls the actuating lever up in a hand brake, the cable connected to the actuating lever causes the disk pad in the caliper to contact the brake disk in order to interrupt the wheels.

In a drum brake type as well as the disk brake type, the cable moves the brake shoes arranged within the drum by actuation of the lever, so that the braking wheel of the brake drum is interrupted.

The actuating lever of the parking brake as described above needs to be within easy reach from foot or hand, in order to readily park as necessary.

Conventional parking brake is typically installed on the floor between the driver's seat and the front seat, and parking is made by pulling the lever up with hand.

The parking brake is made in such a manner that the disk pad and brake shoes are attached to the disk and drum for interruption by pulling up the actuating lever. Because the wheels are conventionally interrupted by surface contact of the disk and disk pad, long-term use brings about abrasion of the disk pad, so that interruption is not ensured.

While the automobile is parked on a slope for a long time or frequently, the disk pad is easily worn, which lowers the braking force and the interruption of the wheels. This has a disadvantage of possibly allowing the automobile to accidentally roll.

Use of a cable in the conventional parking brake increases tension of the cable, which causes to lower interruption on the wheels as well.

SUMMARY OF THE INVENTION

The present invention is derived to solve the conventional problems, and has an object to provide an improved brake for automobiles in which interruption of the wheels is made by pin fixation, not by a disc pad fixation, thereby improving interruption and reliability of the parking brake.

Another object of the invention is to provide an improved brake for automobiles to prevent low interruption of the wheels in a long-time use.

Still another object of the invention is to provide an improved brake for automobiles to improve reliability and marketability of the product.

In order to accomplish the above objects, there is provided a parking brake for automobiles, comprising: brake disk 10 formed with a predetermined width and size, having ratchets 11 at the outer surface of the brake disk, to secure interruption of the wheels in parked automobiles; caliper 20 arranged on the brake disk 10, having an inserting groove 21; intermittent member 30 engaged into the inserting groove 21, for selectively controlling the brake disk 10; connecting arm 40 connected with the intermittent member 30, for delivering an actuating force to the intermittent member 30 upon actuating the parking brake lever 5; connector 50 hingedly connected to the connecting arm 40 at a first end and having a second end; and link member 60 having a movable link 61 connecting to the the second end of the connector 50 to laterally actuate the connector 50 upon actuation of the parking brake lever 5, fixed link 62 associated with the movable link 61, and a return spring arranged between the movable link 61 and the fixed link 62; a pair of auxiliary links 90 on the movable link 61 and the fixed link 62; and actuating bar 100 arranged on the auxiliary links 90 to deliver the actuating force of the parking brake lever 5 to the auxiliary links 90.

Pulling up the parking brake lever 5 of the present invention causes the auxiliary links 90 and the link member 60 to be actuated for engagement of the intermittent member 30 into the ratchet 11 of the brake disk 10 by successive operation of the connector 50 and the connecting arm 40, thereby interrupting the brake disk 10. By this operation, the brake disk 10 is actuated to secure interruption of the parked wheels.

BEST MODE FOR CARRYING OUT THE INVENTION

Figure 1:
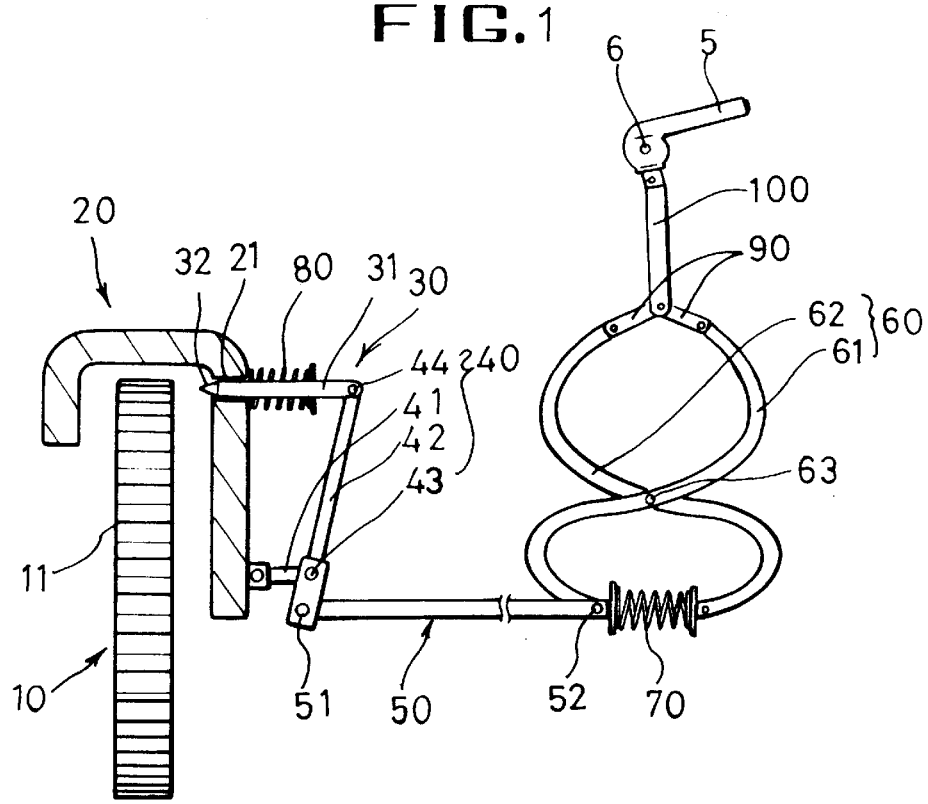
FIG. 1 shows a state before actuating the parking brake lever for automobiles according to the present invention.

FIGS. 1 to 4 show the parking brake according to the present invention. The brake disk 10 is formed to have a predetermined width and size, having a ratchet at the outer surface of the body, to secure interruption of the wheels in parking the automobiles.

The ratchet 11 at the outer periphery of the brake disk 10 is formed in engagement with the intermittent member 30, to ensure the inserting groove with a predetermined width of deeper diameter than the intermittent member 30.

The caliper 20 having an inserting groove 21 at the body is arranged on the brake disk 10.

The inserting groove 21 formed at the body of the caliper 20 is set to the intermittent type of the fixing pin 31.

Figure 2:
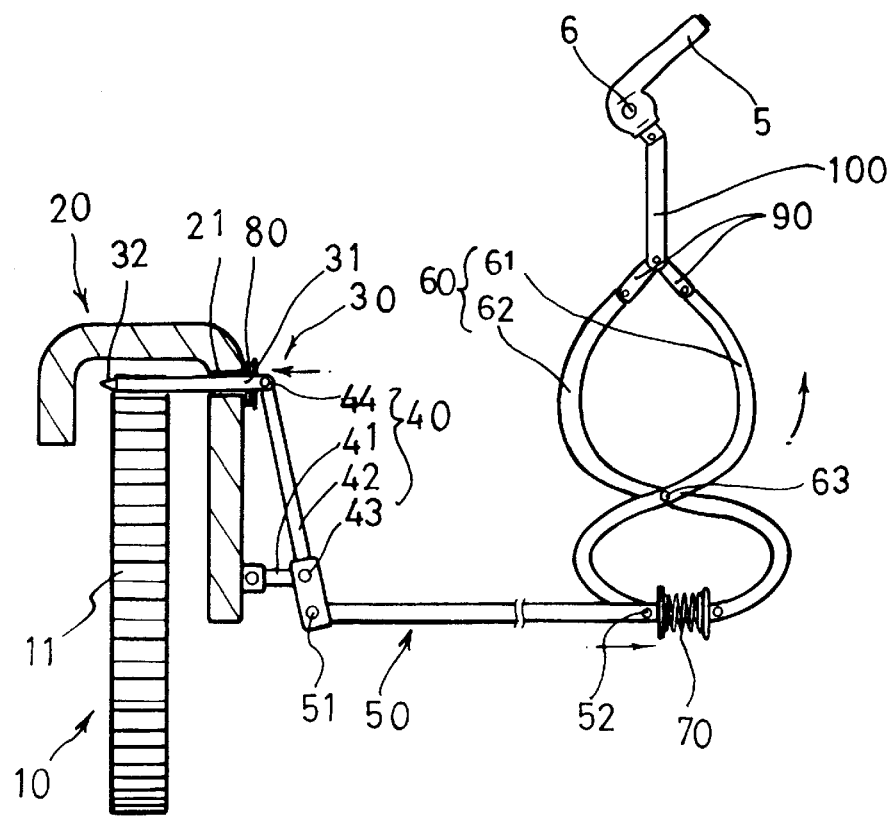
FIG. 2 shows a state after actuating the parking brake lever for automobiles according to the present invention.
Figure 3:
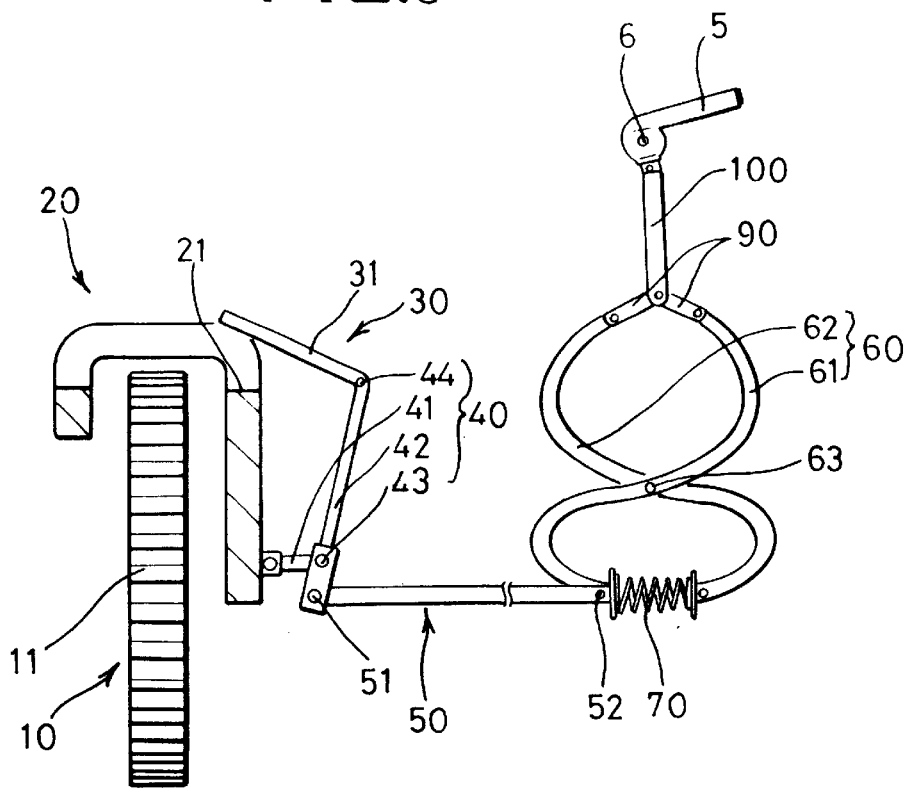
FIG. 3 shows a state before the fixed member is interrupted on the disk brake.
Figure 4:
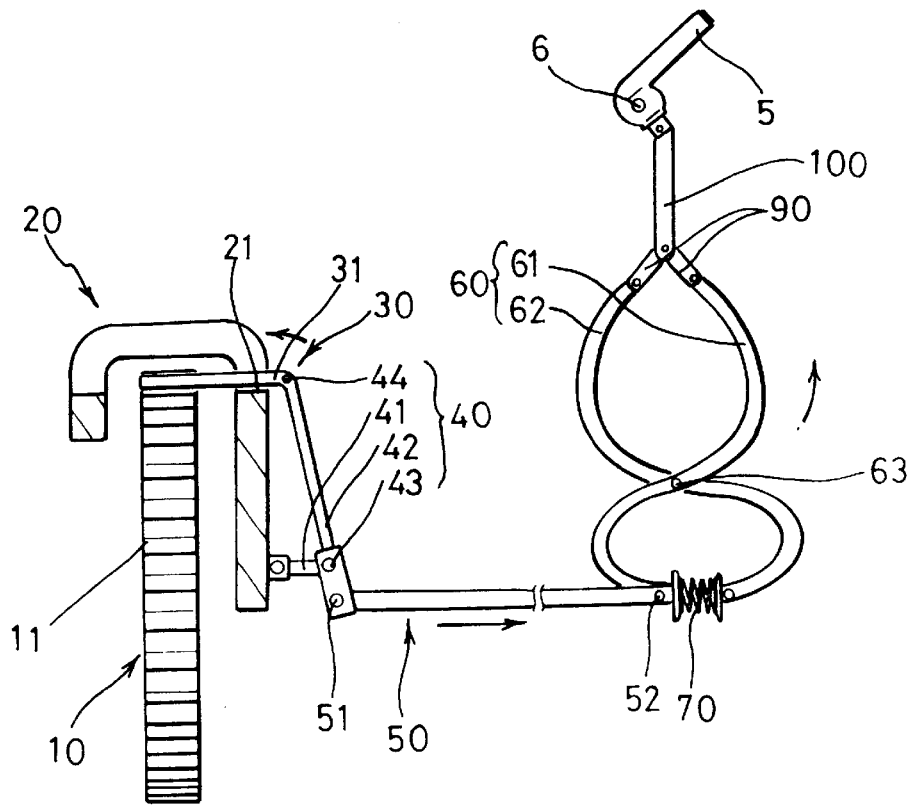
FIG. 4 shows an intermittent state by the fixed member from the upper end of the brake disk after the parking brake lever is actuated.

In such a manner that the fixing pin 31 of the intermittent member 30 is laterally moved in and out, the fixing pin 31 in engagement with the inserting groove 21 at the body of the caliper 20 is selectively moved as the parking brake lever 5 is actuated (FIGS. 1 and 2). In such a manner that the fixing pin 31 of the intermittent member 30 is arranged on the brake disk 10, the inserting groove 21 is formed at the caliper 20 for use.

The fixing pin 31 engaged into the inserting groove 21 of the caliper 20 is formed to engage into the ratchet 11 of the brake disk 10 at the front portion of the body to form a taper 32. The body is preferable to be made in a sphere shape.

In inserting the fixing pin 31 at the ratchet 11 of the brake disk 10, it is preferable to form a rounded shape to make the fixing pin 31 easily inserted into the ratchet 11.

The connecting arm 40 for delivering the actuating force from the parking brake lever 5 to the intermittent member 30 is arranged under the fixing pin 31.

The connecting arm 40 may be perpendicularly connected with the intermittent member 30, to deliver the actuating force to the intermittent member 30 in actuating the connector 50. The connecting arm 40 is connected to the intermittent member 30 and the connector 50 by the support axle 45 and the hinge axle 43. At the end of the support bar 41, the connecting bar 42 is formed.

The connecting arm 40 is fixed to the intermittent member 30 and connector 50 by the support axle 44 and hinge axle 43 at the opposite ends of the connecting bar 42. The supporting bar 41 connects the caliper 20 with the connecting bar 42, so that the actuating force delivered to the connector 50 in actuation of the parking brake lever 5 is delivered to the fixing pin 31 of the intermittent member 30, to interrupt the brake disk 10.

The connecting arm 40 is arranged at the end of the intermittent member 30, while the intermittent member 30 is supported by the support axle 44 at the opposite end of the body in interrupting the brake disk 10.

At the lower end of the connecting arm 40, the hinge 51 is formed at a first end of the connector 50 to hingedly connect to the connecting arm 40. The connector 50 also has a second end 52.

The connector 50 receives the actuating force of the parking brake lever 5 to deliver to the intermittent member 30 via the connecting arm 40.

The length and shape of the connector 50 is adjustable for use in the automobile construction.

The link member 60 is associated with the connector 50 to laterally move the connector 50 upon actuation of the parking brake lever 5.

The link member 60 employs a movable link 61 connected to the connector 50 at the second end and a fixed link 62 that is fixed by the fixed axle 63.

The fixed axle 63 is fixed by the body chassis to serve to actuate the link member 60.

A pair of auxiliary links 90 is arranged above the movable link 61 and the fixed link 62. An actuating bar 100 is formed on the auxiliary link 90 to deliver the actuation of the parking brake lever 5 to the auxiliary link 90.

The link member 60 having the fixed link 62 and the movable link 61, and the auxiliary links 90 as well cause the actuating bar 100 to move in lateral for delivering the actuating force of the parking brake lever 5, to adjust the width of the link member 60. Pulling up the parking brake lever 5 narrows the width of the auxiliary links 90 to actuate the movable link 61, so that the connector 50 connected to the movable link 61 moves laterally.

The connector 50 is moved by movement of the movable link 61, to move the connecting arm 40 toward the caliper 20, to slide the fixing pin 31 of the intermittent member 30 above the connecting arm 40 into and secure within the ratchet 11 of the brake disk 10 through the inserting groove 21 of the caliper 20, thereby securely interrupting the wheels.

In releasing the engagement of the fixing pin 31, the return spring 70 is arranged between the movable link 61 and the fixed link 62.

In the construction of the fixing pin 31 of the intermittent member 30 engaged into the ratchet 11 of the brake disk 10 for interruption, it is preferable to install a buffering spring 80 to prevent noise from the intermittent member 30 contacting the caliper 20 and brake disk 10.

The buffering spring 80 serves to support the return spring 70 in returning the fixing pin 31 of the intermittent member 30.

In the present invention, the braking of the automobiles is achieved by engagement of the intermittent member 30 on the brake disk or at the side of the brake disk after forming the ratchet 11 at the outer periphery of the brake disk 10, not by the surface contact of the disk pad and brake shoes.

Accordingly, the interruption of the wheels is improved and endurance is improved as well.

Further, the present invention prevents rolling of the automobiles on a slope.

What is claimed is:

1. Parking brake for automobiles, comprising:
   brake disk (10) formed with a predetermined width and size, having ratchets (11) at the outer surface of the brake disk (10), to secure interruption of the wheels of parked automobiles;
   caliper (20) arranged on the brake disc (10), having an inserting groove (21);
   intermittent member (30) engaged into the inserting groove (21), for selectively controlling the brake disc (10);
   connecting arm (40) connected with the intermittent member (30), for delivering an actuating force to the intermittent member (30) upon actuating a parking brake lever (5);
   connector (50) hingedly connected to the connecting arm (40) at a first end and having a second end;
   link member (60) having a movable link (61) connected to the second end of the connector (50) to laterally actuate the connector (50) upon actuation of the parking brake lever (5), fixed link (62) associated with the movable link (61), and a return spring arranged between the movable link (61) and the fixed link (62);
   a pair of auxiliary links (90) on the movable link (61) and the fixed link (62); and
   actuating bar (100) arranged on the auxiliary links (90) to deliver the actuating force of the parking brake lever (5) to the auxiliary links (90).

2. Parking brake for automobiles as claimed in claim 1, wherein said intermittent member (30) is arranged to engage the side of the brake disk (10).

3. Parking brake for automobiles as claimed in claim 1, wherein said intermittent member (30) is arranged to engage the brake disk (10).

4. Parking brake for automobiles as claimed in claim 1, wherein the connecting arm (40) is perpendicularly connected with the intermittent member (30), to deliver the actuating force to the intermittent member (30) in actuating the connector (50).

5. Parking brake for automobiles as claimed in claim 1, wherein a buffering spring (80) is formed to prevent noise from the intermittent member (30) contacting the caliper (20) and brake disk (10).

6. Parking brake for automobiles as claimed in claim 1, wherein said intermittent member (30) is arranged to engage the side of the brake disk (10).

7. Parking brake for automobiles as claimed in claim 1, wherein said intermittent member (30) is arranged to engage the brake disk (10).

8. Parking brake for automobiles as claimed in claim 1, wherein the connecting arm (40) is perpendicularly connected with the intermittent member (30), to deliver the actuating force to the intermittent member (30) in actuating the connector (50).

9. Parking brake for automobiles, comprising:

brake disk (10) formed with a predetermined width and size, having ratchets (11) at the outer surface of the brake disk (10), to secure interruption of the wheels of parked automobiles;

caliper (20) arranged on the brake disc (10), having an inserting groove (21);

intermittent member (30) engaged into the inserting groove (21), for selectively controlling the brake disc (10);

a buffering spring (80) formed to prevent noise from the intermittent member (30) contacting the caliper (20) and brake disk (10);

connecting arm (40) connected with the intermittent member (30), for delivering an actuating force to the intermittent member (30) upon actuating a parking brake lever (5);

connector (50) hingedly connected to the connecting arm (40) at a first end and having a second end;

link member (60) having a movable link (61) connected to the second end of the connector (50) to laterally actuate the connector (50) upon actuation of the parking brake lever (5), and a fixed link (62) associated with the movable link (61);

a pair of auxiliary links (90) on the movable link (61) and the fixed link (62); and actuating bar (100) arranged on the auxiliary links (90) to deliver the actuating force of the parking brake lever (5) to the auxiliary links (90).

\* \* \* \* \*